United States Patent
Kuwano

(10) Patent No.: US 10,787,355 B2
(45) Date of Patent: Sep. 29, 2020

(54) CONVEYING EQUIPMENT, ADJUSTMENT ROTATION CONVEYANCE UNIT, AND CONVEYANCE METHOD

(71) Applicant: Dai Nippon Printing Co., Ltd., Shinjuku-Ku, Tokyo (JP)

(72) Inventor: Seiji Kuwano, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/629,648

(22) PCT Filed: Jun. 29, 2018

(86) PCT No.: PCT/JP2018/024791
§ 371 (c)(1),
(2) Date: Jan. 9, 2020

(87) PCT Pub. No.: WO2019/013017
PCT Pub. Date: Jan. 17, 2019

(65) Prior Publication Data
US 2020/0156918 A1 May 21, 2020

(30) Foreign Application Priority Data
Jul. 10, 2017 (JP) ................. 2017-134747

(51) Int. Cl.
*B67C 3/24* (2006.01)
*B65G 47/90* (2006.01)
*B65G 47/86* (2006.01)

(52) U.S. Cl.
CPC ............ *B67C 3/242* (2013.01); *B65G 47/847* (2013.01); *B65G 47/90* (2013.01)

(58) Field of Classification Search
CPC ........ B67C 3/242; B65G 47/90; B65G 47/847
(Continued)

(56) References Cited

U.S. PATENT DOCUMENTS

| 5,996,322 A | 12/1999 | La Barre |
| 2003/0034227 A1* | 2/2003 | Gerber .............. B65G 47/847 198/473.1 |

(Continued)

FOREIGN PATENT DOCUMENTS

| EP | 2138434 A1 * | 12/2009 | ........... B65G 47/847 |
| JP | H11-502175 A1 | 2/1999 | |

(Continued)

OTHER PUBLICATIONS

English translation of International Preliminary Report on Patentability (Chapter I) (Application No. PCT/JP2018/024791) dated Jan. 23, 2020, 7 pages.

(Continued)

*Primary Examiner* — Mark A Deuble
(74) *Attorney, Agent, or Firm* — Burr & Brown, PLLC

(57) ABSTRACT

A conveying equipment (50) includes a first conveyance line (60) having a first upper rotation conveyance unit (61a) and a first lower rotation conveyance unit (61b) and a second conveyance line (70) having a second upper rotation conveyance unit (71a) and a second lower rotation conveyance unit (71b). In the conveying equipment (50), between the first conveyance line (60) and the second conveyance line (70), an adjustment rotation conveyance unit (80) that rotates while gripping at least one of a flange upper portion (17a) and a flange lower portion (17b) of a bottle (10) is provided. The adjustment rotation conveyance unit (80) has an upper gripping part (81a) that is provided to be openable and closable and grips the flange upper portion (17a), and a lower gripping part (81b) that is provided to be openable and closable and grips the flange lower portion (17b).

7 Claims, 13 Drawing Sheets

(58) Field of Classification Search
USPC .............. 198/459.2, 377.01, 377.07, 803.3
See application file for complete search history.

(56) References Cited

U.S. PATENT DOCUMENTS

| | | | | |
|---|---|---|---|---|
| 2010/0294622 A1* | 11/2010 | Graffin | ................ | B65G 47/847 |
| | | | | 198/470.1 |
| 2014/0158500 A1* | 6/2014 | Voth | ...................... | B65G 35/06 |
| | | | | 198/617 |
| 2019/0176343 A1* | 6/2019 | Landler | ................ | B25J 9/0015 |
| 2019/0291971 A1* | 9/2019 | Schulnig | .............. | B65G 47/847 |

FOREIGN PATENT DOCUMENTS

| | | |
|---|---|---|
| JP | H11-236123 A1 | 8/1999 |
| JP | 2003-276838 A1 | 10/2003 |
| JP | 2013-163577 A1 | 8/2013 |

OTHER PUBLICATIONS

International Search Report and Written Opinion (Application No. PCT/JP2018/024791) dated Sep. 25, 2018.

* cited by examiner

CONVEYING EQUIPMENT, ADJUSTMENT ROTATION CONVEYANCE UNIT, AND CONVEYANCE METHOD

TECHNICAL FIELD

The present invention relates to a conveying equipment for a bottle having a flange portion, an adjustment rotation conveyance unit, and a conveyance method.

BACKGROUND ART

Conventionally, for example, a beverage production line for performing processing from molding of a PET bottle as an article to filling of a beverage includes a molding device for molding a PET bottle and a filling device for filling a PET bottle with a beverage or the like. In addition, a conveying equipment for conveying a PET bottle between the molding device and the filling device and connecting the molding device and the filling device to each other is provided (for example, Patent Literature 1).

As a method of conveying a container among the molding device, the conveying equipment, and the filling device as described above, a method of conveying the container while alternately gripping an upper portion and a lower portion of a flange portion of a bottle with a gripper of a rotating wheel is generally used.

However, at the time of conveyance, for example, in the wheels having the grippers that grip the upper portion of the flange portion, the grippers interfere with each other, so that the bottle cannot be delivered. In this case, it is necessary to produce a device in which some device is mirror-inverted in design and to connect the wheels to each other. For example, it is necessary to arrange in a row the wheel having the gripper for gripping the upper portion of the flange portion and the wheel having the gripper for gripping the lower portion of the flange portion. At this time, the two wheels need to rotate in opposite directions. On the other hand, when a mirror-reversed device is produced, a special specification is required, and a great burden is imposed on the design of the device, the arrangement of parts and the assembly of the device. Depending on devices, it may be difficult to produce a mirror-inverted device.

CITATION LIST

Patent Literature

Patent Literature 1: JP 11-502175 A

The present invention has been made in light of such a problem, and an object thereof is to provide a conveying equipment, an adjustment rotation conveyance unit, and a conveyance method that can connect a molding device and a filling device to each other regardless of the specifications of the molding device and the filling device.

SUMMARY OF INVENTION

The present invention is a conveying equipment for a bottle having a flange portion, and the conveying equipment includes a first conveyance line, including a first upper rotation conveyance unit that rotates while gripping a flange upper portion located above the flange portion of the bottle and conveys the bottle and a first lower rotation conveyance unit that rotates while gripping a flange lower portion located below the flange portion of the bottle and conveys the bottle, and a second conveyance line including a second upper rotation conveyance unit that rotates while gripping the flange upper portion of the bottle and conveys the bottle and a second lower rotation conveyance unit that rotates while gripping the flange lower portion of the bottle and conveys the bottle, in which between the first conveyance line and the second conveyance line, an adjustment rotation conveyance unit that rotates while gripping at least one of the flange upper portion and the flange lower portion of the bottle is provided, and the adjustment rotation conveyance unit includes an upper gripping part that is provided to be openable and closable and grips the flange upper portion of the bottle and a lower gripping part that is provided to be openable and closable and grips the flange lower portion of the bottle.

The present invention is the conveying equipment, in which the adjustment rotation conveyance unit uses one of the upper gripping part and the lower gripping part to receive the bottle from the first lower rotation conveyance unit or the first upper rotation conveyance unit of the first conveyance line, and uses the one gripping part to transfer the bottle to the second lower rotation conveyance unit or the second upper rotation conveyance unit of the second conveyance line.

The present invention is the conveying equipment in which the adjustment rotation conveyance unit uses one of the upper gripping part and the lower gripping part to receive the bottle from the first lower rotation conveyance unit or the first upper rotation conveyance unit of the first conveyance line, and, while the adjustment rotation conveyance unit rotates and conveys the bottle, changes gripping of the bottle from the one gripping part to the other gripping part, and the adjustment rotation conveyance unit uses the other gripping part to transfer the bottle to the second upper rotation conveyance unit or the second lower rotation conveyance unit of the second conveyance line.

The present invention is an adjustment rotation conveyance unit provided between a first conveyance line including a first upper rotation conveyance unit that rotates while gripping a flange upper portion located above the flange portion of the bottle and conveys the bottle and a first lower rotation conveyance unit that rotates while gripping a flange lower portion located below the flange portion of the bottle and conveys the bottle, and a second conveyance line including a second upper rotation conveyance unit that rotates while gripping the flange upper portion of the bottle and conveys the bottle and a second lower rotation conveyance unit that rotates while gripping the flange lower portion of the bottle and conveys the bottle, and in the adjustment rotation conveyance unit rotating while gripping at least one of the flange upper portion and the flange lower portion of the bottle, the adjustment rotation conveyance unit includes an upper gripping part provided to be openable and closable and gripping the flange upper portion of the bottle and a lower gripping part provided to be openable and closable and gripping the flange lower portion of the bottle.

The present invention is a conveyance method of a bottle having a flange portion, and the conveyance method includes a first conveyance step of conveying a bottle using a first conveyance line including a first upper rotation conveyance unit that rotates while gripping a flange upper portion located above the flange portion of the bottle and conveys the bottle and a first lower rotation conveyance unit that rotates while gripping a flange lower portion located below the flange portion of the bottle and conveys the bottle, a second conveyance step of conveying the bottle using a second conveyance line including a second upper rotation conveyance unit that rotates while gripping the flange upper portion of the bottle and conveys the bottle and a second lower rotation conveyance unit that rotates while gripping the flange lower portion of the bottle and conveys the bottle, and an adjustment conveyance step of, between the first conveyance step and the second conveyance step, conveying the bottle from the first conveyance line to the second conveyance line using an adjustment rotation conveyance unit that rotates while gripping at least one of the flange upper portion of the bottle and the flange lower portion of the bottle, and in this conveyance method, the adjustment rotation conveyance unit includes an upper gripping part that is provided to be openable and closable and grips the flange upper portion of the bottle and a lower gripping part that is provided to be openable and closable and grips the flange lower portion of the bottle.

The present invention is the conveyance method in which the adjustment conveyance step includes a receiving step of using one of the upper gripping part and the lower gripping part to receive the bottle from the first lower rotation conveyance unit or the first upper rotation conveyance unit of the first conveyance line and a transfer step of using the one gripping part to transfer the bottle to the second lower rotation conveyance unit or the second upper rotation conveyance unit of the second conveyance line.

The present invention is the conveyance method in which the adjustment conveyance step includes a receiving step of using one of the upper gripping part and the lower gripping part to receive the bottle from the first lower rotation conveyance unit or the first upper rotation conveyance unit of the first conveyance line, a gripping change step of changing gripping of the bottle from the one gripping part to the other gripping part while the adjustment rotation conveyance unit rotates and conveys the bottle, and a transfer step of using the other gripping part to transfer the bottle to the second upper rotation conveyance unit or the second lower rotation conveyance unit of the second conveyance line.

According to the present invention, the molding device and the filling device can be connected to each other regardless of the specifications of the molding device and the filling device.

DESCRIPTION OF EMBODIMENTS

First Embodiment

A first embodiment of the present invention will be described below with reference to the drawings. FIGS. 1 to 6 illustrate the first embodiment of the present invention.

Figure 1:
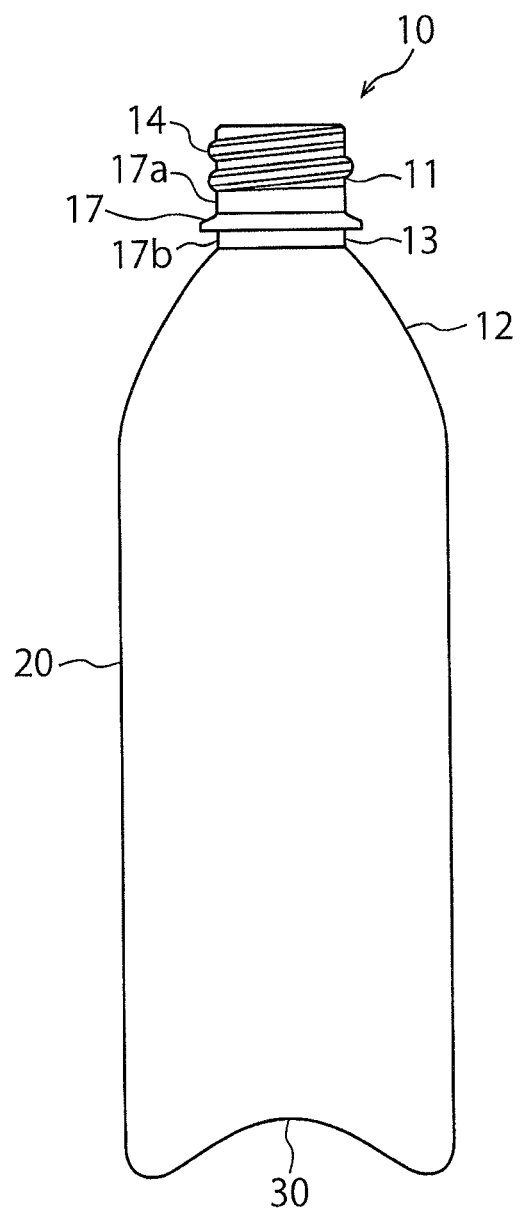
FIG. 1 is a front view illustrating a bottle conveyed by a conveying equipment according to a first embodiment of the present invention.

First, with reference to FIG. 1, a bottle conveyed by a conveying equipment according to the present embodiment will be described. The terms "above" and "below", as used herein, mean above and below, respectively, of an upright bottle (FIG. 1).

A bottle 10 illustrated in FIG. 1 includes a mouth portion 11, a neck portion 13 provided below the mouth portion 11, a shoulder portion 12 provided below the neck portion 13, a trunk portion 20 provided below the shoulder portion 12, and a bottom portion 30 provided below the trunk portion 20.

The mouth portion 11 includes a screw portion 14, onto which a cap (not illustrated) is to be screwed, and a flange portion 17 provided below the screw portion 14. A flange upper portion 17a gripped by an upper gripping part 81a, which will be described later, or the like is provided above the flange portion 17, and a flange lower portion 17b gripped by a lower gripping part 81b, which will be described later, or the like is provided below the flange portion 17.

The bottle 10 thus configured can be made by performing biaxial stretching blow molding on a preform (not illustrated) made by performing injection molding on a synthetic resin material. As materials of the preform, that is, the bottle 10, a thermoplastic resin such as polyethylene (PE), polypropylene (PP), polyethylene-terephthalate (PET), polyethylene naphthalate (PEN), or polycarbonate (PC) can be used.

Although an example in which the present invention is applied to a container as a PET bottle for beverages will be described, in addition to the bottle 10 thus configured, the present invention can be applied to conveyance of various containers.

Figure 2:
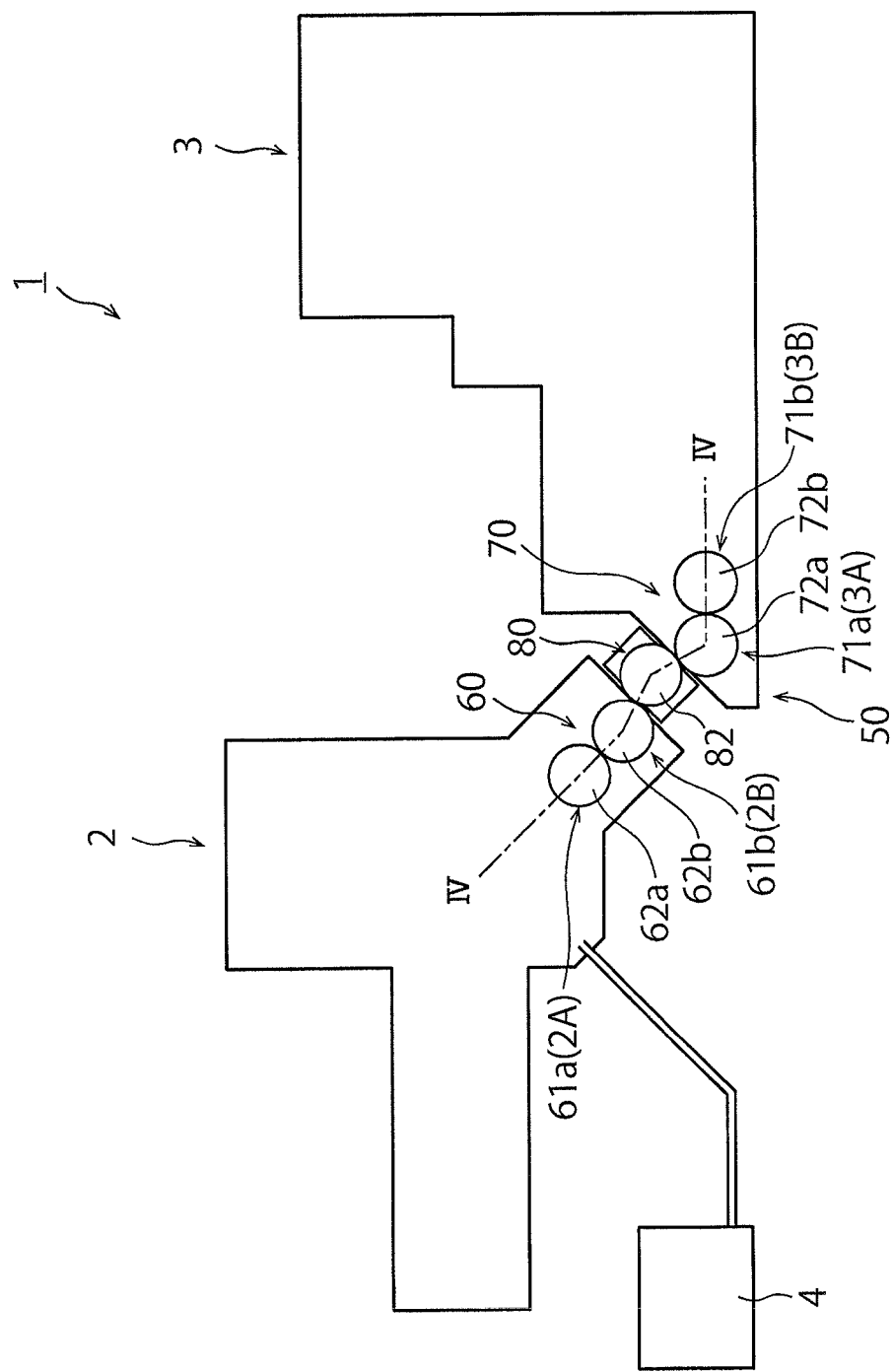
FIG. 2 is a schematic plan view illustrating a beverage production line in which the conveying equipment according to the first embodiment of the present invention is used.
Figure 3:
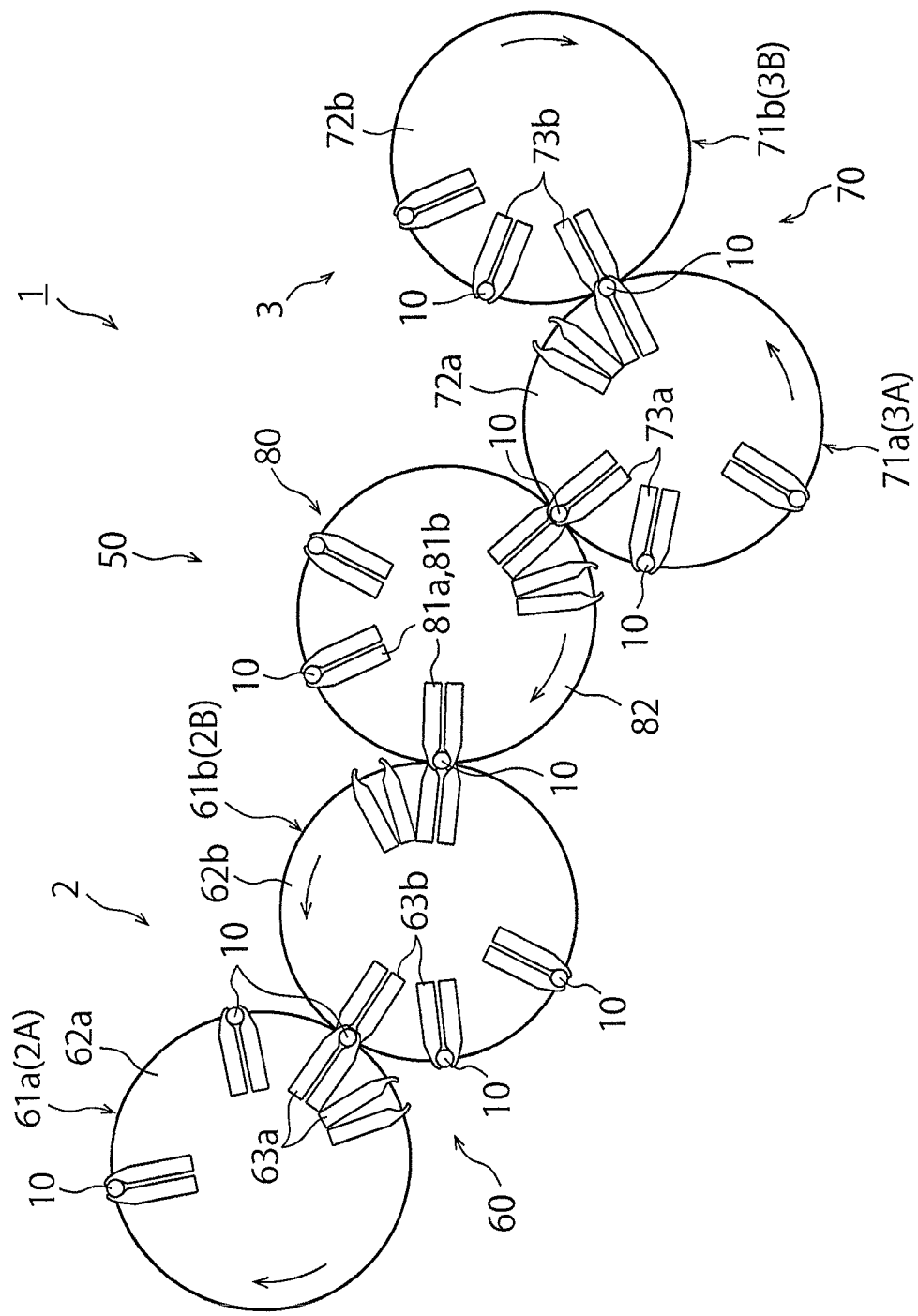
FIG. 3 is a schematic plan view illustrating the conveying equipment according to the first embodiment of the present invention.
Figure 4:
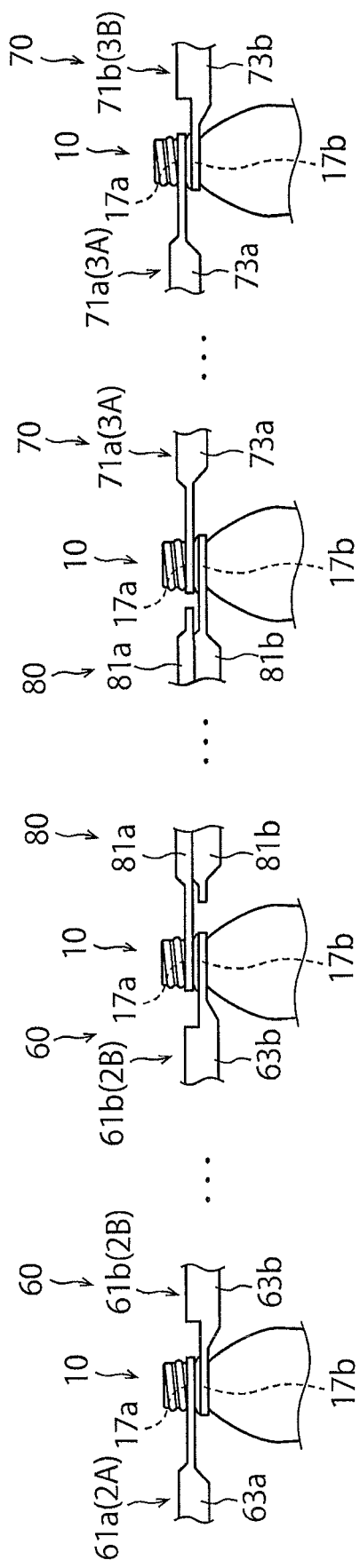
FIG. 4 is a cross-sectional view illustrating the conveying equipment according to the first embodiment of the present invention (a cross-sectional view taken along line IV-IV in FIG. 2).
Figure 5:
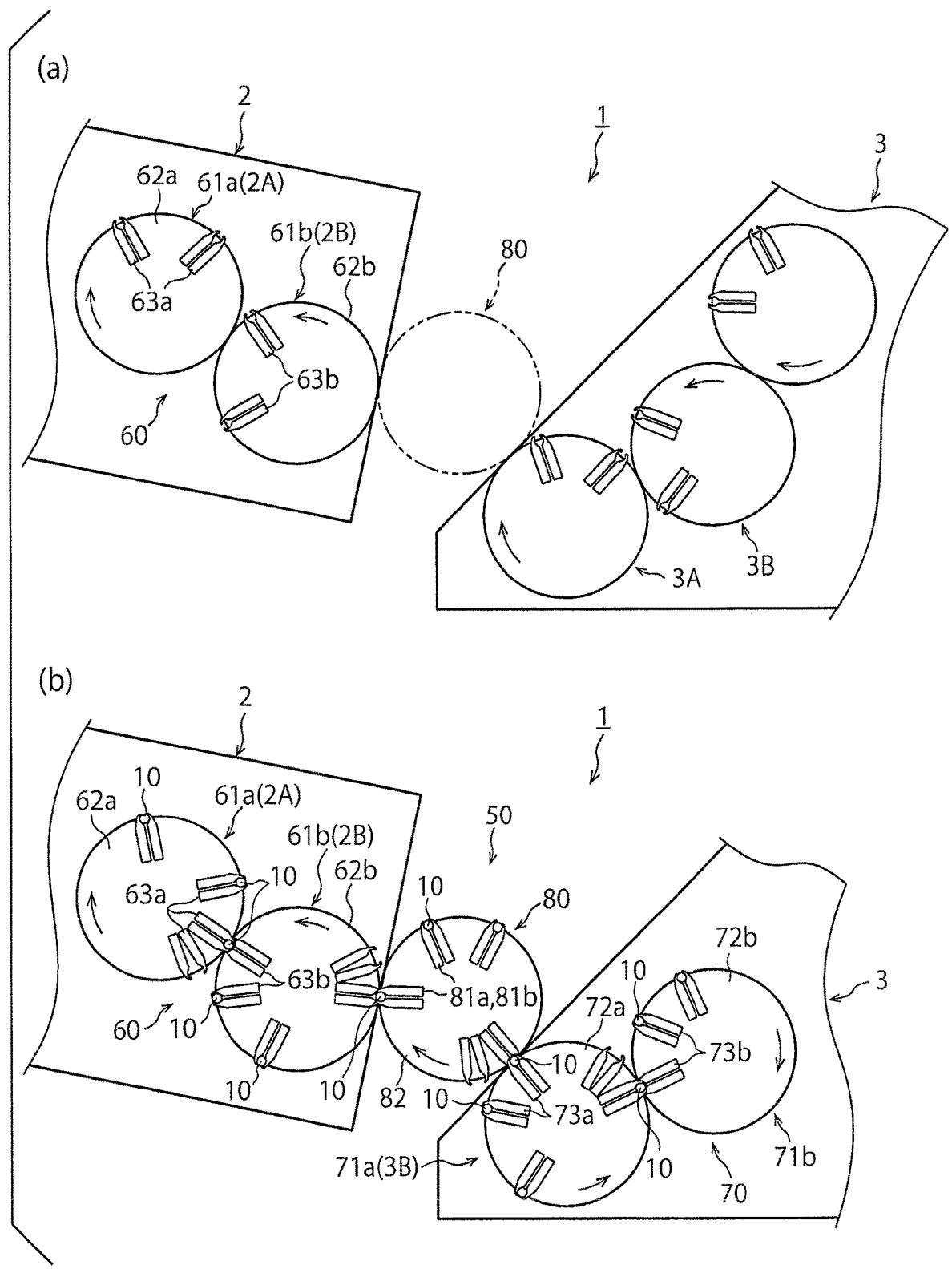
FIG. 5(a) is a schematic plan view illustrating the beverage production line before the conveying equipment according to the first embodiment of the present invention is used.
FIG. 5(b) is a schematic plan view illustrating the beverage production line after the conveying equipment according to the first embodiment of the present invention has been used.
Figure 6:
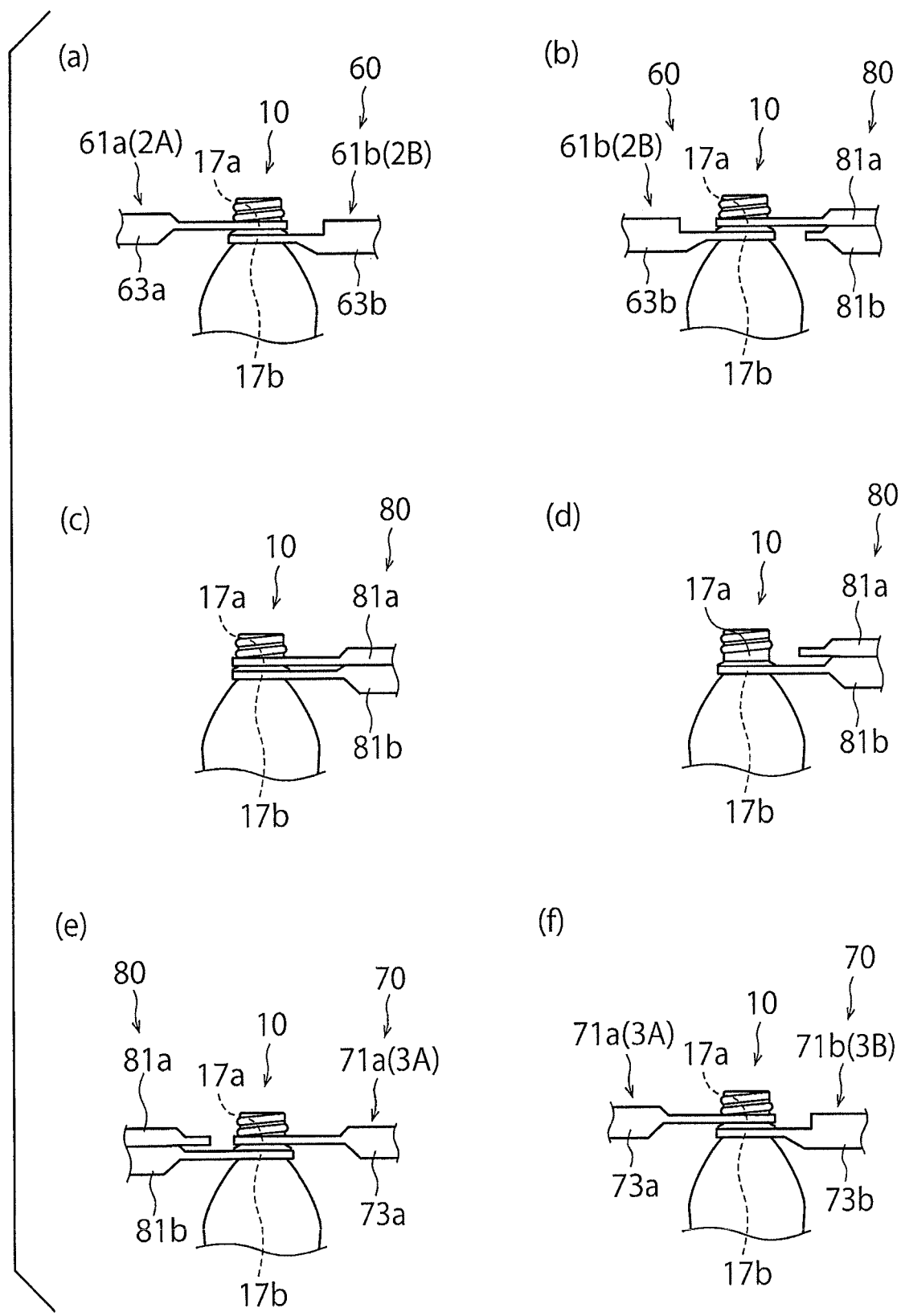
FIGS. 6(a) to 6(f) are cross-sectional views illustrating a conveyance method according to the first embodiment of the present invention.

Next, with reference to FIGS. 2 to 5, a beverage production line in which the conveying equipment is used will be described. FIG. 2 is a schematic plan view illustrating the beverage production line in which the conveying equipment according to the first embodiment of the present invention is used, and FIG. 3 is a schematic plan view illustrating the conveying equipment according to the first embodiment of the present invention. FIG. 4 is a cross-sectional view illustrating the conveying equipment according to the first embodiment of the present invention. FIG. 5(a) is a schematic plan view illustrating the beverage production line before the conveying equipment according to the first embodiment of the present invention is used, and FIG. 5(b) is a schematic plan view illustrating the beverage production line after the conveying equipment according to the first embodiment of the present invention has been used.

As illustrated in FIGS. 2 and 3, a beverage production line 1 includes a molding device 2 that blow-molds a preform into the bottle 10, a filling device 3 that performs processing such as cleaning of the bottle 10 and filling of the bottle 10 with a beverage, and a conveying equipment 50 provided across the molding device 2 and the filling device 3. Among these, near the molding device 2, a preform supply machine 4 that supplies the preform to the molding device 2 is installed. Since the preform supply machine 4 can adopt a known configuration, a detailed description thereof will be omitted in the present specification.

The molding device 2 heats the preform supplied from the preform supply machine 4 and then biaxially stretch blow-molds the preform to produce the bottle 10. The molding device 2 is provided with a plurality of conveyance lines that rotate and convey the molded bottle 10. In the present embodiment, conveyance units 2A and 2B of the two conveyance lines on the downstream side of the molding device 2 are used as a first upper rotation conveyance unit 61a and a first lower rotation conveyance unit 61b, which will be described later, of a first conveyance line 60, which will be described later, of the conveying equipment 50 (see FIGS. 2 to 4). In addition, since the configuration of the molding device 2 can adopt a known configuration, a detailed description thereof will be omitted in the present specification.

Next, the conveying equipment 50 will be described with reference to FIGS. 2 to 5. As illustrated in FIGS. 2 and 3, the conveying equipment 50 is provided in the molding device 2 and includes the first conveyance line 60 that conveys the bottle 10 and a second conveyance line 70 provided in the filling device 3. Between the first conveyance line 60 and the second conveyance line 70, an adjustment rotation conveyance unit 80 that rotates while gripping at least one of the flange upper portion 17a and the flange lower portion 17b of the bottle 10 is provided.

Figure 7:
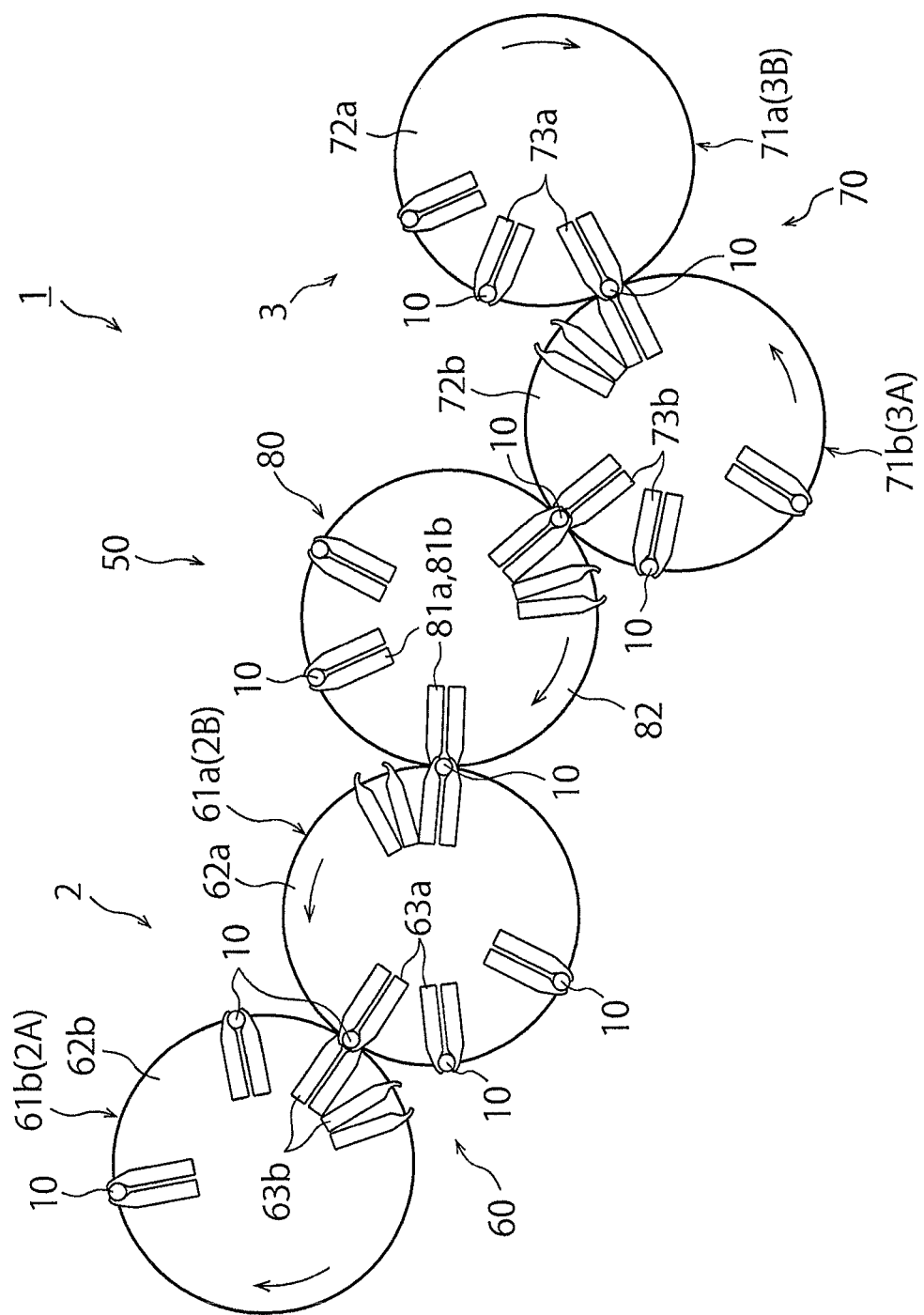
FIG. 7 is a cross-sectional view illustrating a modification of the conveying equipment according to the first embodiment of the present invention.
Figure 8:
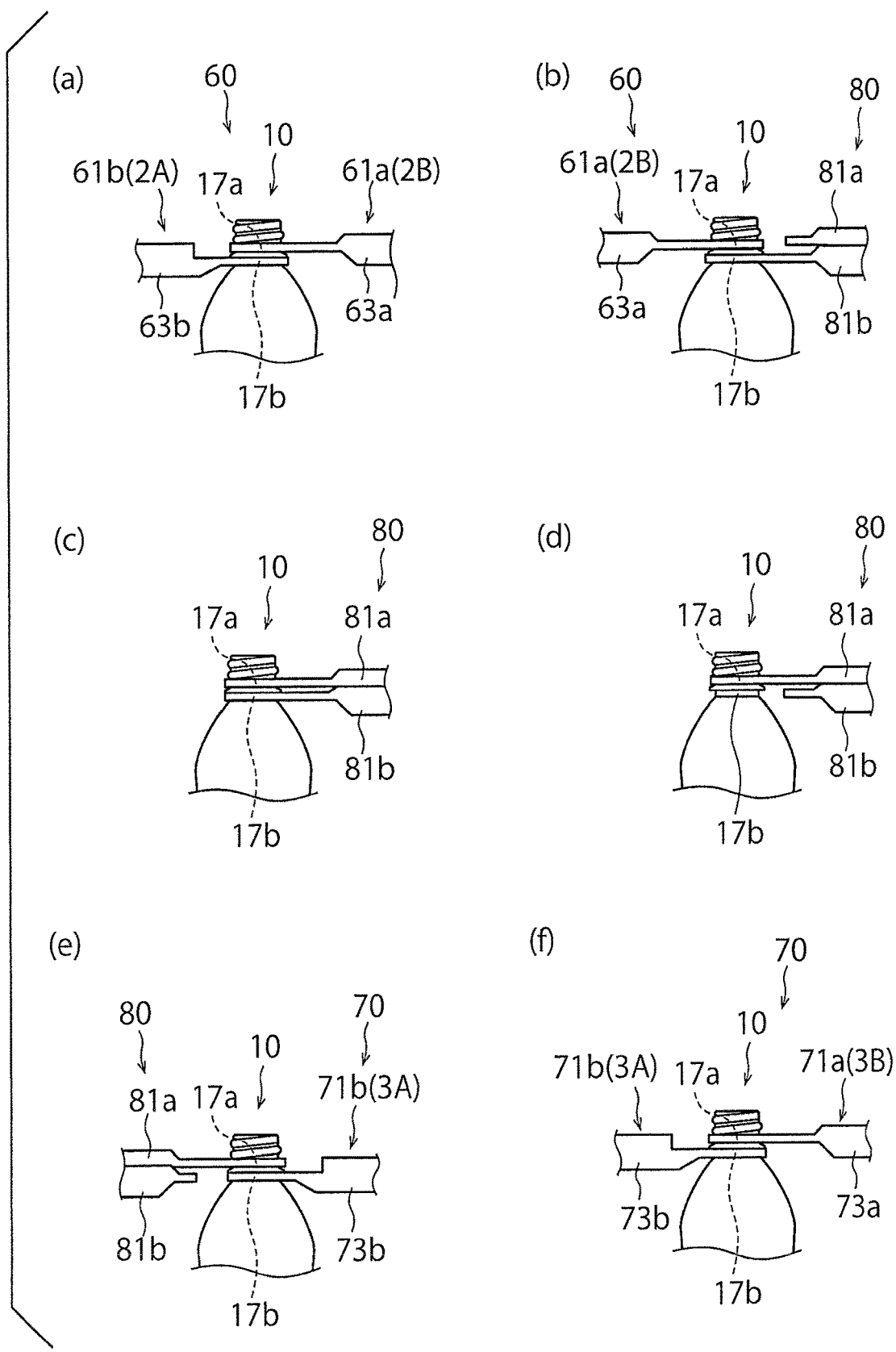
FIGS. 8(a) to 8(f) are cross-sectional views illustrating a modification of the conveyance method according to the first embodiment of the present invention.

As illustrated in FIGS. 3 to 5, the first conveyance line 60 has a first upper rotation conveyance unit 61a that rotates while gripping the flange upper portion 17a and conveys the bottle 10 and a first lower rotation conveyance unit 61b that rotates while gripping the flange lower portion 17b and conveys the bottle 10. The first upper rotation conveyance unit 61a is provided further upstream than the first lower rotation conveyance unit 61b, and transfers the bottle 10 to the first lower rotation conveyance unit 61b. In the present embodiment, as described above, the conveyance units 2A and 2B of the two conveyance lines on the downstream side of the molding device 2 are used as the first upper rotation conveyance unit 61a and the first lower rotation conveyance unit 61b of the first conveyance line 60. As illustrated in FIG. 7, the first lower rotation conveyance unit 61b may be provided further upstream than the first upper rotation conveyance unit 61a. In this case, the first lower rotation conveyance unit 61b transfers the bottle 10 to the first upper rotation conveyance unit 61a (see FIG. 8(a)).

The first upper rotation conveyance unit 61a has a rotatable first upper wheel 62a and a plurality of upper gripping parts 63a provided on the first upper wheel 62a and arranged at equal intervals in a circumferential direction. The upper gripping part 63a rotates (revolves) as the first upper wheel 62a rotates. Similarly, the first lower rotation conveyance unit 61b has a rotatable first lower wheel 62b and a plurality of lower gripping parts 63b provided on the first lower wheel 62b and arranged at equal intervals in the circumferential direction. The lower gripping part 63b rotates (revolves) as the first lower wheel 62b rotates. In the present embodiment, the first upper rotation conveyance unit 61a rotates clockwise in plan view in FIG. 3, and the first lower rotation conveyance unit 61b rotates counterclockwise in plan view in FIG. 3. As the upper gripping part 63a and the lower gripping part 63b, known grippers can be employed. FIG. 3 illustrates only some upper gripping parts 63a and lower gripping parts 63b.

As illustrated in FIGS. 3 and 4, the adjustment rotation conveyance unit 80 has the upper gripping part 81a that is provided to be openable and closable and grips the flange upper portion 17a, and the lower gripping part 81b that is provided to be openable and closable and grips the flange lower portion 17b. A plurality of the upper gripping parts 81a and the lower gripping parts 81b are arranged at equal intervals in the circumferential direction on a rotatable adjustment rotation wheel 82. The upper gripping part 81a and the lower gripping part 81b rotate (revolve) as the adjustment rotation wheel 82 rotates. In the present embodiment, the upper gripping part 81a and the lower gripping part 81b rotate clockwise in plan view in FIG. 3. As the upper gripping part 81a and the lower gripping part 81b, known grippers can be employed. FIG. 3 illustrates only some upper gripping parts 81a and lower gripping parts 81b.

The adjustment rotation conveyance unit 80 uses one of the upper gripping part 81a and the lower gripping part 81b to receive the bottle 10 from the first lower rotation conveyance unit 61b or the first upper rotation conveyance unit 61a of the first conveyance line 60. As illustrated in FIG. 4, in the present embodiment, the adjustment rotation conveyance unit 80 uses the upper gripping part 81a to receive the bottle 10 from the lower gripping part 63b of the first lower rotation conveyance unit 61b. In this case, the upper gripping part 81a grips the flange upper portion 17a of the bottle 10 by changing the upper gripping part 81a from an open state to a closed state. At this time, the lower gripping part 81b is not used. In this case, the lower gripping part 81b is maintained in the open state so that the lower gripping part 81b and the lower gripping part 63b of the first lower rotation conveyance unit 61b do not interfere with each other. As illustrated in FIG. 7, when the first lower rotation conveyance unit 61b is provided further upstream than the first upper rotation conveyance unit 61a, the adjustment rotation conveyance unit 80 uses the lower gripping part 81b to receive the bottle 10 from the upper gripping part 63a of the first upper rotation conveyance unit 61a (see FIG. 8(b)). In this case, the lower gripping part 81b grips the flange lower portion 17b of the bottle 10 by changing the lower gripping part 81b from the open state to the closed state. At this time, the upper gripping part 81a is not used. In this case, the upper gripping part 81a is maintained in the open state so that the upper gripping part 81a and the upper gripping part 63a of the first upper rotation conveyance unit 61a do not interfere with each other.

As illustrated in FIG. 4, when the adjustment rotation conveyance unit 80 transfers the bottle 10 to a second lower rotation conveyance unit 71b or a second upper rotation conveyance unit 71a, which will be described later, of the second conveyance line 70, the adjustment rotation conveyance unit 80 changes gripping of the bottle 10 from one gripping part gripping the bottle 10 to the other gripping part while the adjustment rotation conveyance unit 80 rotates and conveys the bottle 10, and uses the other gripping part to transfer the bottle 10 to the second lower rotation conveyance unit 71b or the second upper rotation conveyance unit 71a of the second conveyance line 70. That is, when the upstream conveyance unit 2B (the first lower rotation conveyance unit 61b in the present embodiment) of the adjustment rotation conveyance unit 80 and a downstream conveyance unit 3A (the second upper rotation conveyance unit 71a in the present embodiment) grip different portions of the bottle 10 (the flange upper portion 17a or the flange lower portion 17b), while the adjustment rotation conveyance unit 80 rotates and conveys the bottle 10, gripping of the bottle 10 is changed from one gripping part to the other gripping part. In the present embodiment, the adjustment rotation conveyance unit 80 uses the upper gripping part 81a to receive the bottle 10 from the lower gripping part 63b of the first lower rotation conveyance unit 61b and changes gripping of the bottle 10 from the upper gripping part 81a that has received the bottle 10 to the lower gripping part 81b. That is, in a state where the flange upper portion 17a of the bottle 10 is gripped by the upper gripping part 81a, the lower gripping part 81b located below the upper gripping part 81a is closed to grip the flange lower portion 17b. Thereafter, the upper gripping part 81a is opened, so that gripping of the bottle 10 is changed from the upper gripping part 81a to the lower gripping part 81b. Then, the adjustment rotation conveyance unit 80 uses the lower gripping part 81b to transfer the bottle 10 to an upper gripping part 73a, which will be described later, of the second upper rotation conveyance unit 71a of the second conveyance line 70. As illustrated in FIG. 7, when the first lower rotation conveyance unit 61b is provided further upstream than the first upper rotation conveyance unit 61a and the second lower rotation conveyance unit 71b is provided further upstream than the second upper rotation conveyance unit 71a, the adjustment rotation conveyance unit 80 uses the lower gripping part 81b to receive the bottle 10 from the upper gripping part 63a of the first upper rotation conveyance unit 61a (see FIG. 8(b)) and changes gripping of the bottle 10 from the lower gripping part 81b that has received the bottle 10 to the upper gripping part 81a (see FIGS. 8(c) to 8(d)). Then, the adjustment rotation conveyance unit 80 uses the upper gripping part 81a to transfer the bottle 10 to the lower gripping part 73b, which will be described later, of the second lower rotation conveyance unit 71b of the second conveyance line 70 (see FIG. 8(e)).

As illustrated in FIGS. 3 and 4, the second conveyance line 70 has the second upper rotation conveyance unit 71a that rotates while gripping the flange upper portion 17a and conveys the bottle 10 and the second lower rotation conveyance unit 71b that rotates while gripping the flange lower portion 17b and conveys the bottle 10. As illustrated in FIGS. 3 and 4, the second upper rotation conveyance unit 71a is provided further upstream than the second lower rotation conveyance unit 71b, and receives the bottle 10 from the lower gripping part 81b. At this time, the upper gripping part 81a of the adjustment rotation conveyance unit 80 is maintained in the open state so that the second upper rotation conveyance unit 71a and the upper gripping part 81a do not interfere with each other. Then, the second upper rotation conveyance unit 71a transfers the bottle 10 to the second lower rotation conveyance unit 71b. In the present embodiment, the conveyance units 3A and 3B of the two conveyance lines on the downstream side of the filling device 3 are used as the second upper rotation conveyance unit 71a and the second lower rotation conveyance unit 71b of the second conveyance line 70. As illustrated in FIG. 7, when the second lower rotation conveyance unit 71b is provided further upstream than the second upper rotation conveyance unit 71a, the second lower rotation conveyance unit 71b receives the bottle 10 from the upper gripping part 81a (see FIG. 8(e)). In this case, the lower gripping part 81b of the adjustment rotation conveyance unit 80 is maintained in the open state so that the lower gripping part 81b and the second lower rotation conveyance unit 71b do not interfere with each other. Then, the second lower rotation conveyance unit 71b transfers the bottle 10 to the second upper rotation conveyance unit 71a.

The second upper rotation conveyance unit 71a has a rotatable second upper wheel 72a and a plurality of upper gripping parts 73a provided on the second upper wheel 72a and arranged at equal intervals in the circumferential direction. The upper gripping part 73a rotates (revolves) as the second upper wheel 72a rotates. Similarly, the second lower rotation conveyance unit 71b has a rotatable second lower wheel 72b and a plurality of lower gripping parts 73b provided on the second lower wheel 72b and arranged at equal intervals in the circumferential direction. The lower gripping part 73b rotates (revolves) as the second lower wheel 72b rotates. In the present embodiment, the second upper rotation conveyance unit 71a rotates counterclockwise in plan view in FIG. 3, and the second lower rotation conveyance unit 71b rotates clockwise in plan view in FIG. 3. As the upper gripping part 73a and the lower gripping part 73b, known grippers can be employed. FIG. 3 illustrates only some upper gripping parts 73a and lower gripping parts 73b.

The filling device 3 illustrated in FIGS. 2 and 3 cleans and sterilizes the bottle 10, fills the bottle 10 with a beverage, and closes the bottle 10 filled with the beverage with a cap, thus producing a beverage-containing bottle. The filling device 3 is provided with a plurality of conveyance lines that rotate and convey the bottle 10. In the present embodiment, as described above, the conveyance units 3A and 3B of the two conveyance lines on the upstream side of the filling device 3 are used as the second upper rotation conveyance unit 71a and the second lower rotation conveyance unit 71b described above (see FIGS. 2 to 4). In addition, since the configuration of the filling device 3 can adopt a known configuration, a detailed description thereof will be omitted in the present specification.

As illustrated in FIG. 5(a), the most downstream conveyance unit 2B of the molding device 2 and the most upstream conveyance unit 3A of the filling device 3 may rotate in opposite directions from each other and may grip the same portion of the bottle 10. That is, when the conveyance unit 2B and the conveyance unit 3A are prepared separately, the conveyance unit 2B and the conveyance unit 3A may rotate in opposite directions from each other and may grip the flange lower portion 17b of the bottle 10, for example. In this case, even if the adjustment rotation conveyance unit 80 is provided, the molding device 2 and the filling device 3 cannot be connected. In such a case, as illustrated in FIG. 5(b), for example, the conveyance unit 3A of the filling device 3 is removed and the adjustment rotation conveyance unit 80 is provided, or although not illustrated, a wheel (a rotation conveyance unit rotating counterclockwise in plan view and having, for example, the upper gripping part 73a) is separately provided between the adjustment rotation conveyance unit 80 and conveyance unit 3A, whereby the molding device 2 and the filling device 3 can be connected.

Next, an operation of the present embodiment will be explained with reference to FIGS. 6(a) to 6(f). Here, a conveyance method of the bottle 10 using the conveying equipment 50 illustrated in FIGS. 2 to 5 will be described. FIGS. 6(a) to 6(f) are cross-sectional views illustrating a conveyance method according to the first embodiment of the present invention (views corresponding in part to FIG. 4).

First, a preform for molding the bottle 10 is supplied from the preform supply machine 4 to the molding device 2. In the molding device 2, the preform is heated and then biaxially stretch blow-molded to mold the bottle 10 having a desired shape from the preform.

The blow-molded bottle 10 is conveyed to the first conveyance line 60. Then, the bottle 10 is conveyed using the first conveyance line 60 (first conveyance step). In this case, first, the first upper rotation conveyance unit 61a uses the upper gripping part 63a to convey the bottle 10 clockwise in plan view. Next, the first upper rotation conveyance unit 61a transfers the bottle 10 to the first lower rotation conveyance unit 61b (FIG. 6(a)). At this time, the lower gripping part 63b of the first lower rotation conveyance unit 61b grips the flange lower portion 17b of the bottle 10, and receives the bottle 10 from the upper gripping part 63a of the first upper rotation conveyance unit 61a. Next, in a state where the lower gripping part 63b that has received the bottle 10 grips the flange lower portion 17b of the bottle 10, the first lower rotation conveyance unit 61b rotates counterclockwise in plan view and conveys the bottle 10.

Next, the bottle 10 from the first lower rotation conveyance unit 61b is conveyed to the adjustment rotation conveyance unit 80, and the adjustment rotation conveyance unit 80 conveys the bottle 10 from the first conveyance line 60 to the second conveyance line 70 (adjustment conveyance step). In this case, first, the adjustment rotation conveyance unit 80 uses the upper gripping part 81a to receive the bottle 10 from the first lower rotation conveyance unit 61b of the first conveyance line 60 (receiving step) (FIG. 6(b)). At this time, the upper gripping part 81a is changed from the open state to the closed state, and the upper gripping part 81a grips the flange upper portion 17a of the bottle 10. In this case, the lower gripping part 81b is maintained in the open state and does not interfere with the lower gripping part 63b of the first lower rotation conveyance unit 61b. Next, the upper gripping part 81a that has received the bottle 10 rotates clockwise in plan view while gripping the flange upper portion 17a of the bottle 10, and conveys the bottle 10. At this time, while the adjustment rotation conveyance unit 80 rotates and conveys the bottle 10, gripping of the bottle 10 is changed from the upper gripping part 81a to the lower gripping part 81b (gripping change step) (FIG. 6(c)). When gripping of the bottle 10 is changed, first, the lower gripping part 81b is changed from the open state to the closed state while the upper gripping part 81a is maintained in the closed state. Accordingly, in a state where the upper gripping part 81a grips the flange upper portion 17a of the bottle 10, the lower gripping part 81b grips the flange lower portion 17b of the bottle 10. Next, the upper gripping part 81a is changed from the closed state to the open state, and the bottle 10 is opened (FIG. 6(d)). Next, in a state where the lower gripping part 81b grips the flange lower portion 17b of the bottle 10, the adjustment rotation conveyance unit 80 rotates clockwise in plan view and conveys the bottle 10. Then, the adjustment rotation conveyance unit 80 uses the lower gripping part 81b to transfer the bottle 10 to the second upper rotation conveyance unit 71a of the second conveyance line 70 (transfer step) (FIG. 6(e)). At this time, the upper gripping part 73a of the second upper rotation conveyance unit 71a grips the flange upper portion 17a of the bottle 10, and receives the bottle 10 from the lower gripping part 81b. In this case, the upper gripping part 81a is maintained in the open state and does not interfere with the upper gripping part 73a of the second upper rotation conveyance unit 71a.

Thereafter, the bottle 10 from the adjustment rotation conveyance unit 80 is transferred to the second conveyance line 70, and the bottle 10 is conveyed by the second conveyance line 70 (second conveyance step). In this case, in a state where the upper gripping part 73a of the second upper rotation conveyance unit 71a that has received the bottle 10 grips the flange upper portion 17a, the second upper rotation conveyance unit 71a rotates counterclockwise in plan view and conveys the bottle 10. Then, the second upper rotation conveyance unit 71a transfers the bottle 10 to the second lower rotation conveyance unit 71b (FIG. 6(f)). At this time, the lower gripping part 73b of the second lower rotation conveyance unit 71b grips the flange lower portion 17b of the bottle 10, and receives the bottle 10 from the upper gripping part 73a of the second upper rotation conveyance unit 71a. Thereafter, in the filling device 3, the bottle 10 is cleaned and sterilized, and the bottle 10 is filled with a beverage. Then, the bottle 10 filled with the beverage is closed with a cap to produce a beverage-containing bottle.

In this way, the bottle 10 is conveyed from the molding device 2 to the filling device 3 using the conveying equipment 50. Although the example in which the first upper rotation conveyance unit 61a is provided further upstream than the first lower rotation conveyance unit 61b and the second upper rotation conveyance unit 71a is provided further upstream than the second lower rotation conveyance unit 71b has been described, the present invention is not limited to this example. For example, as illustrated in FIG. 7, the first lower rotation conveyance unit 61b may be provided further upstream than the first upper rotation conveyance unit 61a, and the second lower rotation conveyance unit 71b may be provided further upstream than the second upper rotation conveyance unit 71a. In this case, as illustrated in FIGS. 8(a) to 8(f), first, the first lower rotation conveyance unit 61b transfers the bottle 10 to the first upper rotation conveyance unit 61a (FIG. 8(a)). Next, the adjustment rotation conveyance unit 80 uses the lower gripping part 81b to receive the bottle 10 from the first upper rotation conveyance unit 61a of the first conveyance line 60 (FIG. 8(b)). Next, the adjustment rotation conveyance unit 80 changes gripping of the bottle 10 from the lower gripping part 81b to the upper gripping part 81a (FIGS. 8(c) to 8(d)). Next, the adjustment rotation conveyance unit 80 uses the upper gripping part 81a to transfer the bottle 10 to the second lower rotation conveyance unit 71b of the second conveyance line 70 (FIG. 8(e)). Then, the second lower rotation conveyance unit 71b transfers the bottle 10 to the second upper rotation conveyance unit 71a (FIG. 8(f)).

As described above, according to the present embodiment, between the first conveyance line 60 and the second conveyance line 70, the adjustment rotation conveyance unit 80 that rotates while gripping at least one of the flange upper portion 17a and the flange lower portion 17b of the bottle 10 is provided. The adjustment rotation conveyance unit 80 has the upper gripping part 81a that is provided to be openable and closable and grips the flange upper portion 17a of the bottle 10, and the lower gripping part 81b that is provided to be openable and closable and grips the flange lower portion 17b of the bottle 10. Consequently, the bottle 10 can be conveyed from the molding device 2 to the filling device 3 regardless of the position at which the first upper rotation conveyance unit 61a or the first lower rotation conveyance unit 61b of the first conveyance line 60 and the second upper rotation conveyance unit 71a or the second lower rotation conveyance unit 71b of the second conveyance line 70 grip the bottle 10. That is, even when the upstream conveyance unit 2B (the first upper rotation conveyance unit 61a or the first lower rotation conveyance unit 61b) of the adjustment rotation conveyance unit 80 and the downstream conveyance unit 3A (the second upper rotation conveyance unit 71a or the second lower rotation conveyance unit 71b) grip different portions of the bottle 10, the bottle 10 is received from the first lower rotation conveyance unit 61b or the first upper rotation conveyance unit 61a of the first conveyance line 60 by using one of the upper gripping part 81a and the lower gripping part 81b, and while the adjustment rotation conveyance unit 80 rotates and conveys the bottle 10, gripping of the bottle 10 is changed from the one gripping part to the other gripping part, and the bottle 10 can be transferred to the second upper rotation conveyance unit 71a or the second lower rotation conveyance unit 71b of the second conveyance line 70 by using the other gripping part. Consequently, the bottle 10 can be conveyed from the molding device 2 to the filling device 3. Thus, the molding device 2 and the filling device 3 can be connected to each other regardless of the specifications of the molding device 2 and the filling device 3.

In the present embodiment, the example has been described in which the conveyance units 2A and 2B of the two conveyance lines on the downstream side of the molding device 2 are used as the first upper rotation conveyance unit 61a and the first lower rotation conveyance unit 61b, and the conveyance units 3A and 3B of the two conveyance lines on the upstream side of the filling device 3 are used as the second upper rotation conveyance unit 71a and the second lower rotation conveyance unit 71b. However, the present invention is not limited to this example. For example, in order to connect individual conveyance lines in the molding device 2, the first upper rotation conveyance unit 61a, the first lower rotation conveyance unit 61b, the second upper rotation conveyance unit 71a, and the second lower rotation conveyance unit 71b may be provided in the molding device 2.

Second Embodiment

Figure 9:
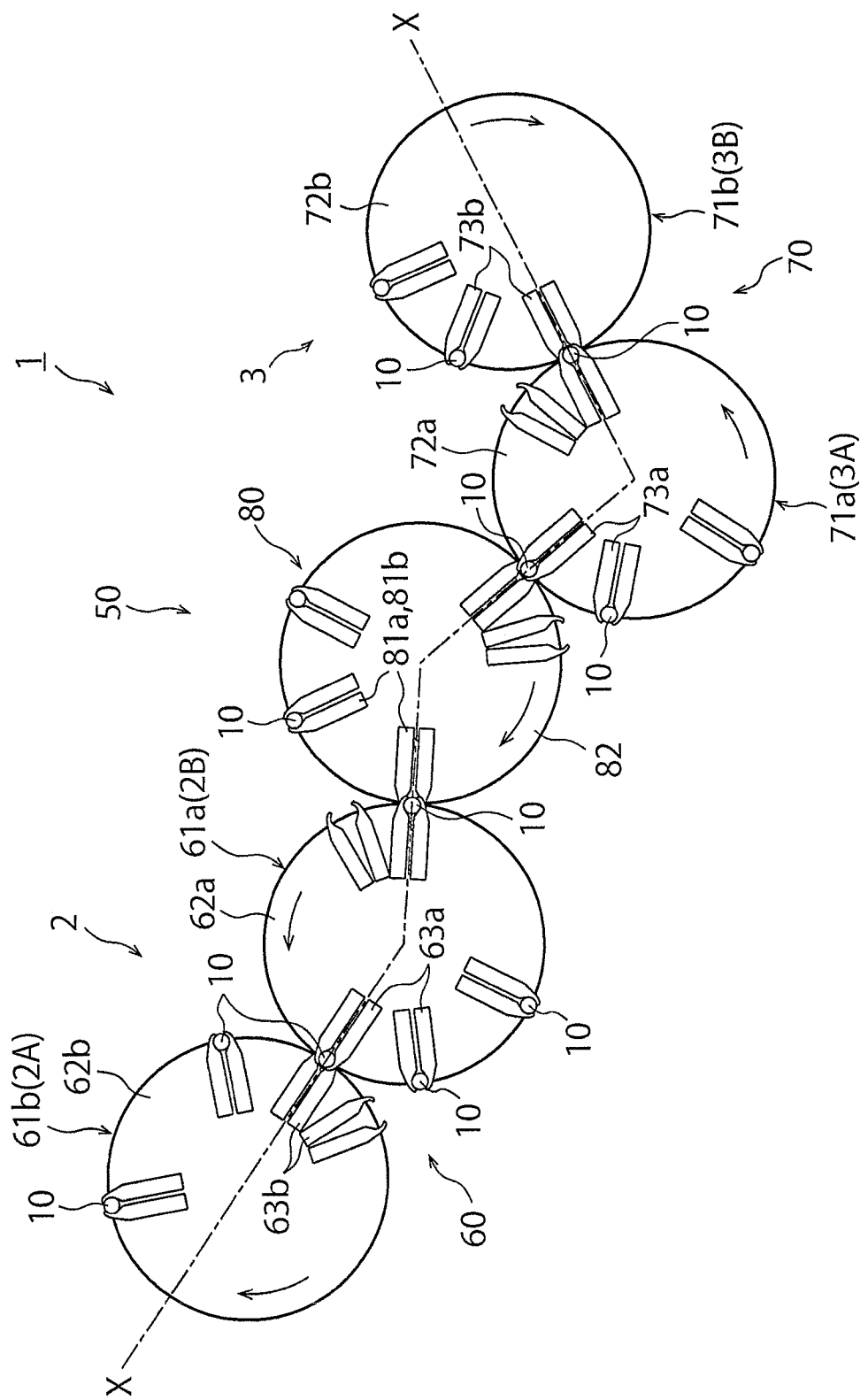
FIG. 9 is a schematic plan view illustrating a conveying equipment according to a second embodiment of the present invention.
Figure 10:
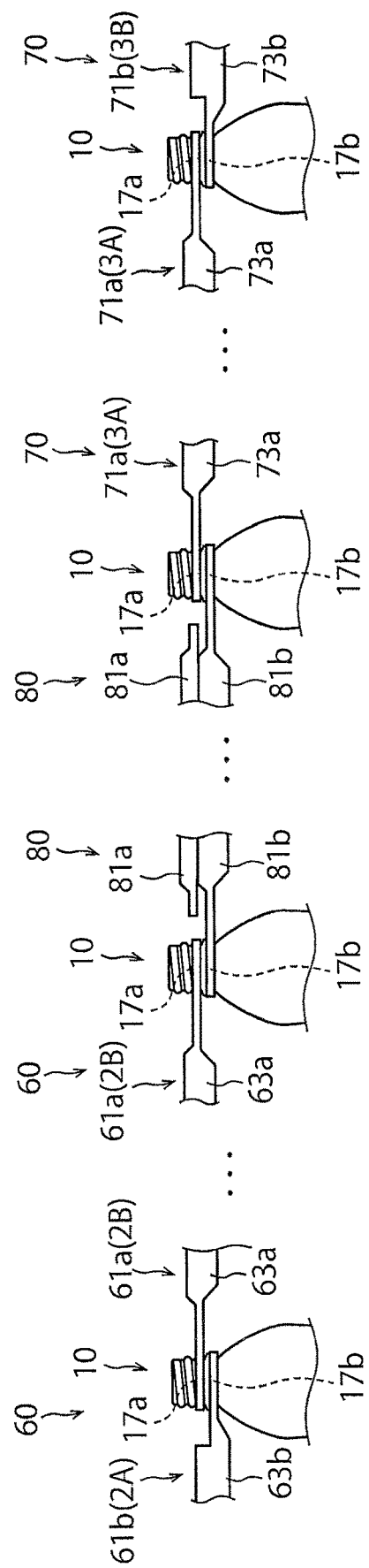
FIG. 10 is a cross-sectional view illustrating the conveying equipment according to the second embodiment of the present invention (a cross-sectional view taken along line X-X in FIG. 9).
Figure 11:
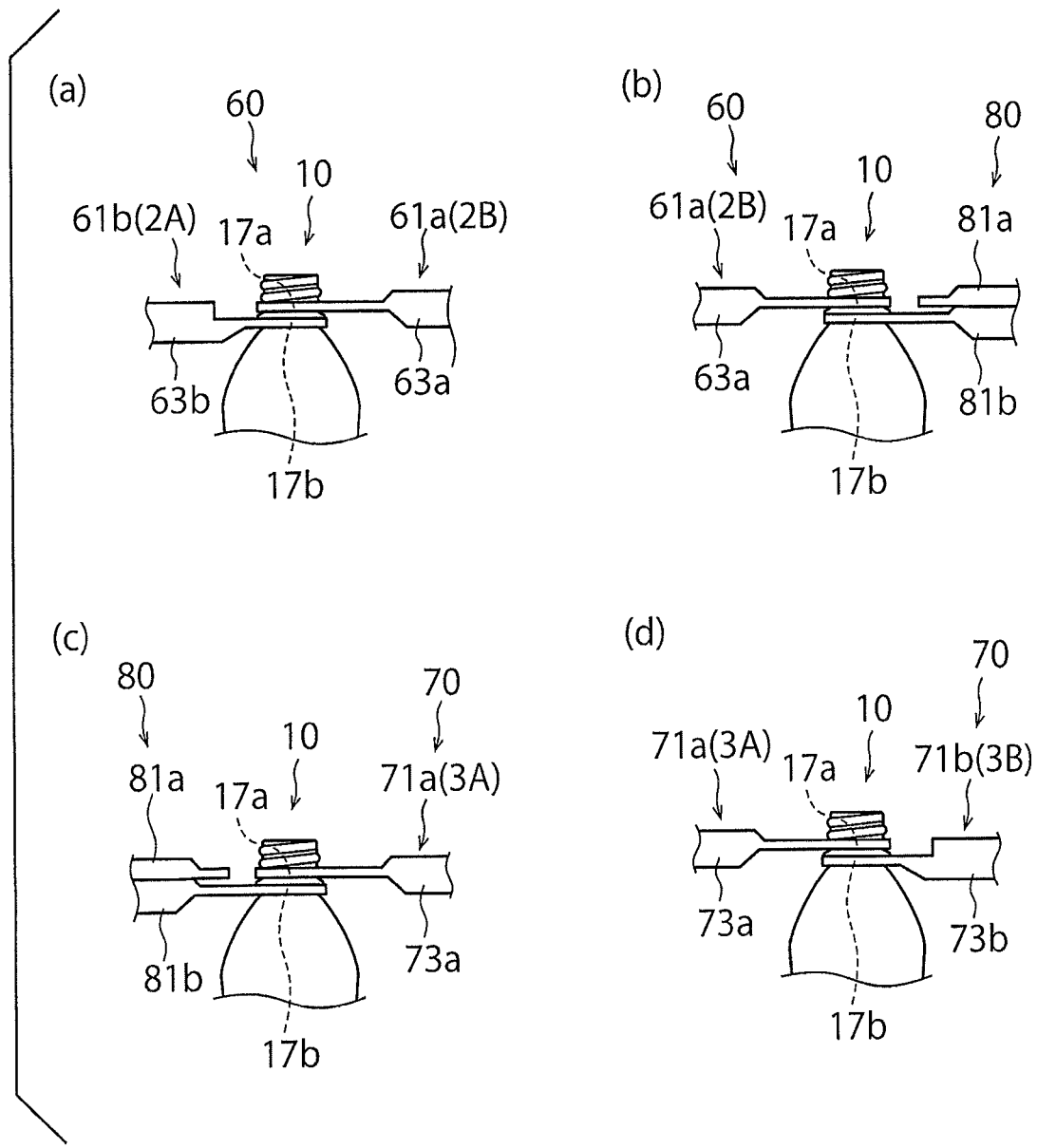
FIGS. 11(a) to 11(d) are cross-sectional views illustrating a conveyance method according to the second embodiment of the present invention.

Next, a second embodiment of the present invention will be described below with reference to FIGS. 9, 10 and 11(a) to 11(d). FIG. 9 is a schematic plan view illustrating a conveying equipment according to the second embodiment of the present invention, and FIG. 10 is a cross-sectional view illustrating the conveying equipment according to the second embodiment of the present invention. FIGS. 11(a) to 11(d) are cross-sectional views illustrating a conveyance method according to the second embodiment of the present invention (views corresponding in part to FIG. 10). The second embodiment illustrated in FIGS. 9, 10 and 11(a) to 11(d) is different from the first embodiment in that the adjustment rotation conveyance unit 80 mainly uses the gripping part that has received the bottle 10 to transfer the bottle 10 to the second lower rotation conveyance unit 71b or the second upper rotation conveyance unit 71a of the second conveyance line 70. In FIGS. 9, 10, and 11(a) to 11(d), the same portions as those in the first embodiment will be assigned the same reference numerals and will not be described in detail.

As illustrated in FIG. 9, the first lower rotation conveyance unit 61b according to the present embodiment is provided further upstream than the first upper rotation conveyance unit 61a, and transfers the bottle 10 to the first upper rotation conveyance unit 61a. The first upper rotation conveyance unit 61a rotates counterclockwise in plan view in FIG. 9, and the first lower rotation conveyance unit 61b rotates clockwise in plan view in FIG. 9.

Figure 12:
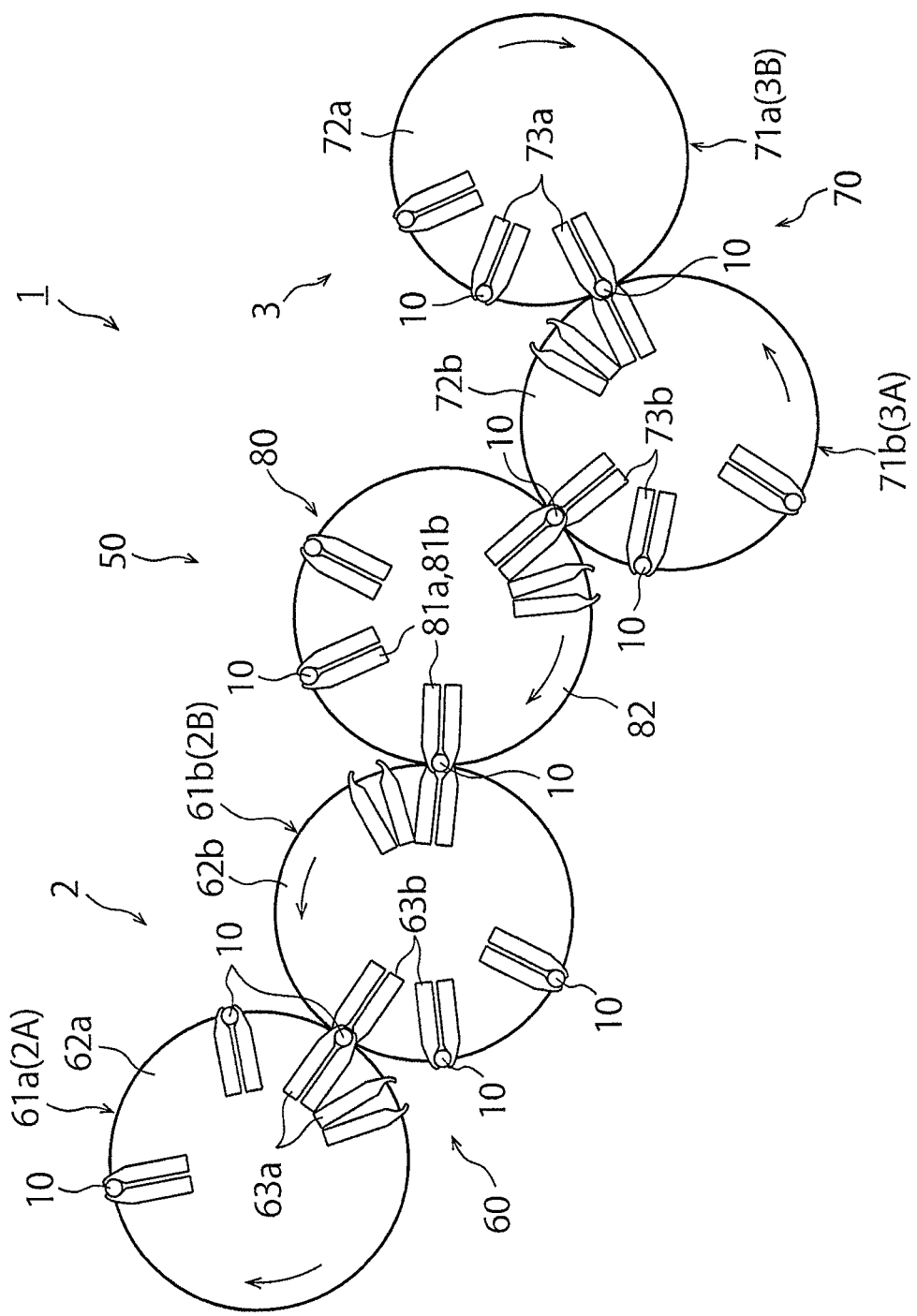
FIG. 12 is a cross-sectional view illustrating a modification of the conveying equipment according to the second embodiment of the present invention.
Figure 13:
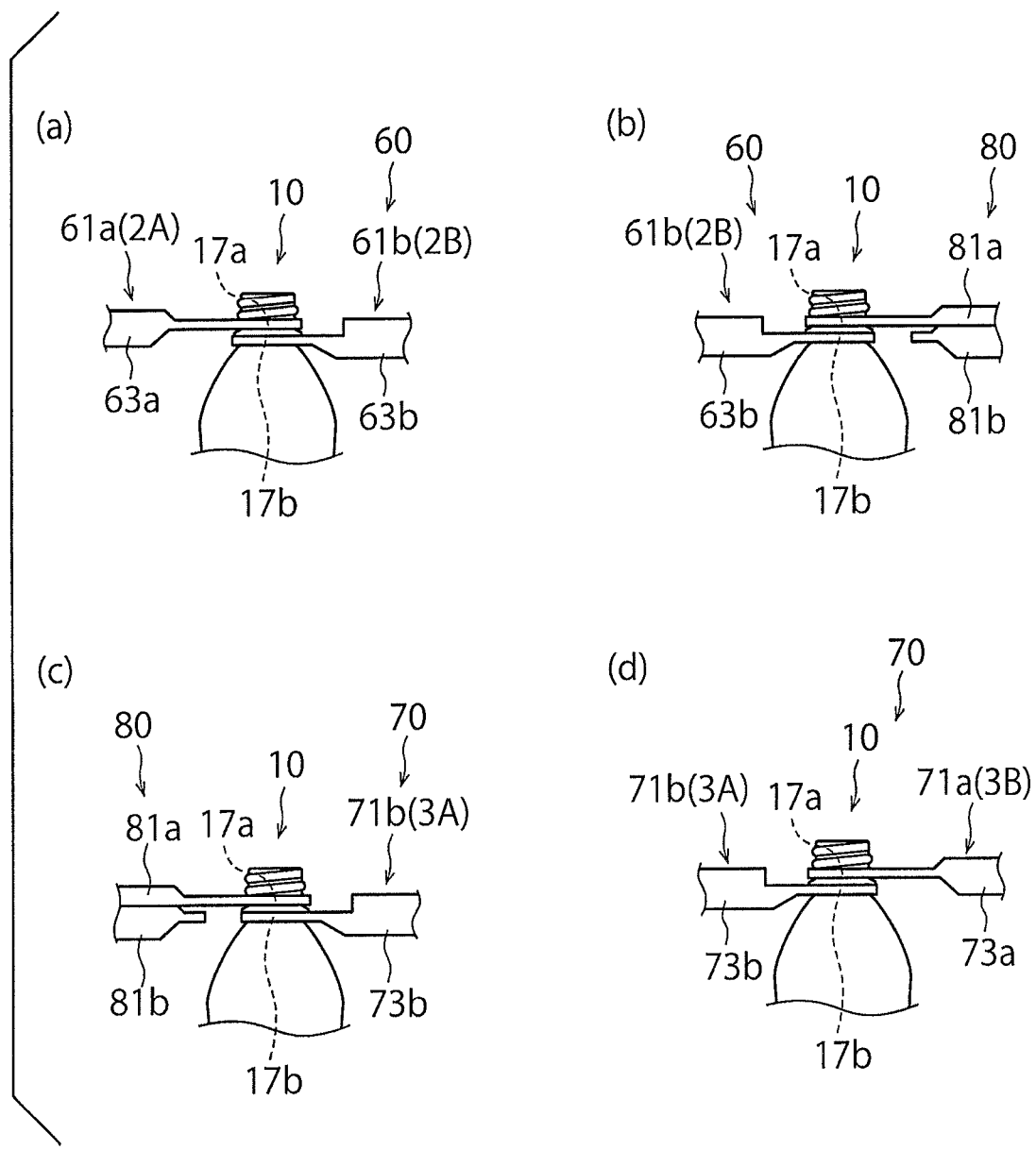
FIGS. 13(a) to 13(d) are cross-sectional views illustrating a modification of the conveyance method according to the second embodiment of the present invention.

As illustrated in FIG. 10, the adjustment rotation conveyance unit 80 uses one of the gripping parts gripping the bottle 10 to transfer the bottle 10 to the second lower rotation conveyance unit 71b or the second upper rotation conveyance unit 71a, which will be described later, of the second conveyance line 70. That is, as illustrated in FIG. 10, the upper gripping part 63a of the upstream first upper rotation conveyance unit 61a of the adjustment rotation conveyance unit 80 and the upper gripping part 73a of the downstream second upper rotation conveyance unit 71a grip the same portion of the bottle 10 (in this case, the flange upper portion 17a), the adjustment rotation conveyance unit 80 uses the lower gripping part 81b to receive the bottle 10 from the upper gripping part 63a of the first upper rotation conveyance unit 61a and uses the lower gripping part 81b that has received the bottle 10 to transfer the bottle 10 to the upper gripping part 73a of the second upper rotation conveyance unit 71a. As illustrated in FIG. 12, when the first upper rotation conveyance unit 61a is provided further upstream than the first lower rotation conveyance unit 61b and the second lower rotation conveyance unit 71b is provided further upstream than the second upper rotation conveyance unit 71a, the adjustment rotation conveyance unit 80 uses the upper gripping part 81a to receive the bottle 10 from the lower gripping part 63b of the first lower rotation conveyance unit 61b (see FIG. 13(b)) and uses the upper gripping part 81a that has received the bottle 10 to transfer the bottle 10 to the lower gripping part 73b of the second lower rotation conveyance unit 71b (see FIG. 13(c)).

Next, an operation of the present embodiment will be explained with reference to FIGS. 11(a) to 11(d). Here, a conveyance method of the bottle 10 using the conveying equipment 50 illustrated in FIGS. 9 and 10 will be described.

First, the bottle 10 is conveyed using the first conveyance line 60 (first conveyance step). In this case, first, the first lower rotation conveyance unit 61b uses the lower gripping part 63b to convey the bottle 10 clockwise in plan view. Next, the first lower rotation conveyance unit 61b transfers the bottle 10 to the first upper rotation conveyance unit 61a (FIG. 11(a)). At this time, the upper gripping part 63a of the first upper rotation conveyance unit 61a grips the flange upper portion 17a of the bottle 10, and receives the bottle 10 from the lower gripping part 63b of the first lower rotation conveyance unit 61b. Next, in a state where the upper gripping part 63a that has received the bottle 10 grips the flange upper portion 17a of the bottle 10, the first upper rotation conveyance unit 61a rotates counterclockwise in plan view and conveys the bottle 10.

Next, the bottle 10 from the first upper rotation conveyance unit 61a is conveyed to the adjustment rotation conveyance unit 80, and the adjustment rotation conveyance unit 80 conveys the bottle 10 from the first conveyance line 60 to the second conveyance line 70 (adjustment conveyance step). In this case, first, the adjustment rotation conveyance unit 80 uses the lower gripping part 81b to receive the bottle 10 from the first upper rotation conveyance unit 61a of the first conveyance line 60 (receiving step) (FIG. 11(b)). At this time, the lower gripping part 81b is changed from the open state to the closed state, and the lower gripping part 81b grips the flange lower portion 17b of the bottle 10. In this case, the upper gripping part 81a is maintained in the open state and does not interfere with the upper gripping part 63a of the first upper rotation conveyance unit 61a. Next, in a state where the lower gripping part 81b that has received the bottle 10 grips the flange lower portion 17b of the bottle 10, the adjustment rotation conveyance unit 80 rotates clockwise in plan view and conveys the bottle 10. Then, the adjustment rotation conveyance unit 80 uses the lower gripping part 81b that has received the bottle 10 to transfer the bottle 10 to the second upper rotation conveyance unit 71a of the second conveyance line 70 (transfer step) (FIG. 11(c)). At this time, the upper gripping part 73a of the second upper rotation conveyance unit 71a grips the flange upper portion 17a of the bottle 10, and receives the bottle 10 from the lower gripping part 81b. In this case, the upper gripping part 81a is maintained in the open state and does not interfere with the upper gripping part 73a of the second upper rotation conveyance unit 71a.

Thereafter, the bottle 10 from the adjustment rotation conveyance unit 80 is transferred to the second conveyance line 70, and the bottle 10 is conveyed by the second conveyance line 70 (second conveyance step). In this case, the second upper rotation conveyance unit 71a transfers the bottle 10 to the second lower rotation conveyance unit 71b (FIG. 11(d)). Thereafter, in the filling device 3, the bottle 10 is cleaned and sterilized, and the bottle 10 is filled with a beverage. Then, the bottle 10 filled with the beverage is closed with a cap to produce a beverage-containing bottle.

In this way, the bottle 10 is conveyed from the molding device 2 to the filling device 3 using the conveying equipment 50. Although the example has been described in which the first lower rotation conveyance unit 61b is provided further upstream than the first upper rotation conveyance unit 61a and the second upper rotation conveyance unit 71a is provided further upstream than the second lower rotation conveyance unit 71b, the present invention is not limited to this example. For example, as illustrated in FIG. 12, the first upper rotation conveyance unit 61a may be provided further upstream than the first lower rotation conveyance unit 61b, and the second lower rotation conveyance unit 71b may be provided further upstream than the second upper rotation conveyance unit 71a. In this case, as illustrated in FIGS. 13(a) to 13(d), first, the first upper rotation conveyance unit 61a transfers the bottle 10 to the first lower rotation conveyance unit 61b (FIG. 13(a)). Next, the adjustment rotation conveyance unit 80 uses the upper gripping part 81a to receive the bottle 10 from the first lower rotation conveyance unit 61b of the first conveyance line 60 (FIG. 13(b)). Thereafter, the adjustment rotation conveyance unit 80 uses the upper gripping part 81a to transfer the bottle 10 to the second lower rotation conveyance unit 71b of the second conveyance line 70 (FIG. 13(c)). Then, the second lower rotation conveyance unit 71b transfers the bottle 10 to the second upper rotation conveyance unit 71a (FIG. 13(d)).

As described above, according to the present embodiment, even when the upstream conveyance unit 2B (the first upper rotation conveyance unit 61a or the first lower rotation conveyance unit 61b) of the adjustment rotation conveyance unit 80 and the downstream conveyance unit 3A (the second upper rotation conveyance unit 71a or the second lower rotation conveyance unit 71b) grip the same portion of the bottle 10, the bottle 10 is received from the first lower rotation conveyance unit 61b or the first upper rotation conveyance unit 61a of the first conveyance line 60 by using one of the upper gripping part 81a and the lower gripping part 81b, and using the one gripping part, the bottle 10 can be transferred to the second upper rotation conveyance unit 71a or the second lower rotation conveyance unit 71b of the second conveyance line 70. Consequently, the bottle 10 can be conveyed from the molding device 2 to the filling device 3, and the molding device 2 and the filling device 3 can be connected to each other regardless of the specifications of the molding device 2 and the filling device 3.

It is possible to appropriately combine the plurality of constituent elements disclosed in the above embodiments and modifications as necessary. Alternatively, some constituent elements may be omitted from all the constituent elements shown in the above embodiments and modifications.

The invention claimed is:

1. A conveying equipment for a bottle having a flange portion, comprising:
   a first conveyance line comprising a first upper rotation conveyance unit that rotates while gripping a flange upper portion located above the flange portion of the bottle and conveys the bottle and a first lower rotation conveyance unit that rotates while gripping a flange lower portion located below the flange portion of the bottle and conveys the bottle; and
   a second conveyance line comprising a second upper rotation conveyance unit that rotates while gripping the flange upper portion of the bottle and conveys the bottle and a second lower rotation conveyance unit that rotates while gripping the flange lower portion of the bottle and conveys the bottle,
   wherein between the first conveyance line and the second conveyance line, an adjustment rotation conveyance unit that rotates while gripping at least one of the flange upper portion and the flange lower portion of the bottle is provided, and
   the adjustment rotation conveyance unit comprises an upper gripping part that is provided to be openable and closable and grips the flange upper portion of the bottle and a lower gripping part that is provided to be openable and closable and grips the flange lower portion of the bottle.

2. The conveying equipment according to claim 1, wherein the adjustment rotation conveyance unit uses one of the upper gripping part and the lower gripping part to receive the bottle from the first lower rotation conveyance unit or the first upper rotation conveyance unit of the first conveyance line, and uses the one gripping part to transfer the bottle to the second lower rotation conveyance unit or the second upper rotation conveyance unit of the second conveyance line.

3. The conveying equipment according to claim 1, wherein the adjustment rotation conveyance unit uses one of the upper gripping part and the lower gripping part to receive the bottle from the first lower rotation conveyance unit or the first upper rotation conveyance unit of the first conveyance line, and, while the adjustment rotation conveyance unit rotates and conveys the bottle, changes gripping of the bottle from the one gripping part to the other gripping part, and the adjustment rotation conveyance unit uses the other gripping part to transfer the bottle to the second upper rotation conveyance unit or the second lower rotation conveyance unit of the second conveyance line.

4. An adjustment rotation conveyance unit provided between a first conveyance line comprising a first upper rotation conveyance unit that rotates while gripping a flange upper portion located above the flange portion of the bottle and conveys the bottle and a first lower rotation conveyance unit that rotates while gripping a flange lower portion located below the flange portion of the bottle and conveys the bottle, and a second conveyance line comprising a second upper rotation conveyance unit that rotates while gripping the flange upper portion of the bottle and conveys the bottle and a second lower rotation conveyance unit that rotates while gripping the flange lower portion of the bottle and conveys the bottle, the adjustment rotation conveyance unit rotating while gripping at least one of the flange upper portion and the flange lower portion of the bottle, the adjustment rotation conveyance unit comprising:
- an upper gripping part provided to be openable and closable and gripping the flange upper portion of the bottle; and
- a lower gripping part provided to be openable and closable and gripping the flange lower portion of the bottle.

5. A conveyance method of a bottle having a flange portion, comprising:
- a first conveyance step of conveying a bottle using a first conveyance line comprising a first upper rotation conveyance unit that rotates while gripping a flange upper portion located above the flange portion of the bottle and conveys the bottle and a first lower rotation conveyance unit that rotates while gripping a flange lower portion located below the flange portion of the bottle and conveys the bottle;
- a second conveyance step of conveying the bottle using a second conveyance line comprising a second upper rotation conveyance unit that rotates while gripping the flange upper portion of the bottle and conveys the bottle and a second lower rotation conveyance unit that rotates while gripping the flange lower portion of the bottle and conveys the bottle; and
- an adjustment conveyance step of, between the first conveyance step and the second conveyance step, conveying the bottle from the first conveyance line to the second conveyance line using an adjustment rotation conveyance unit that rotates while gripping at least one of the flange upper portion of the bottle and the flange lower portion of the bottle, wherein the adjustment rotation conveyance unit comprises an upper gripping part that is provided to be openable and closable and grips the flange upper portion of the bottle and a lower gripping part that is provided to be openable and closable and grips the flange lower portion of the bottle.

6. The conveyance method according to claim 5, wherein the adjustment conveyance step comprises:
- a receiving step of using one of the upper gripping part and the lower gripping part to receive the bottle from the first lower rotation conveyance unit or the first upper rotation conveyance unit of the first conveyance line; and
- a transfer step of using the one gripping part to transfer the bottle to the second lower rotation conveyance unit or the second upper rotation conveyance unit of the second conveyance line.

7. The conveyance method according to claim 5, wherein the adjustment conveyance step comprises:
- a receiving step of using one of the upper gripping part and the lower gripping part to receive the bottle from the first lower rotation conveyance unit or the first upper rotation conveyance unit of the first conveyance line;
- a gripping change step of changing gripping of the bottle from the one gripping part to the other gripping part while the adjustment rotation conveyance unit rotates and conveys the bottle; and
- a transfer step of using the other gripping part to transfer the bottle to the second upper rotation conveyance unit or the second lower rotation conveyance unit of the second conveyance line.

* * * * *